(12) United States Patent
Gitlin et al.

(10) Patent No.: US 10,880,731 B2
(45) Date of Patent: Dec. 29, 2020

(54) SYSTEM AND METHOD FOR ENHANCED DIVERSITY AND NETWORK CODING (EDC-NC)

(71) Applicant: University of South Florida, Tampa, FL (US)

(72) Inventors: Richard Dennis Gitlin, Tampa, FL (US); Nabeel Ibrahim Sulieman, Tampa, FL (US)

(73) Assignee: University of South Florida, Tampa, FL (US)

( * ) Notice: Subject to any disclaimer, the term of this patent is extended or adjusted under 35 U.S.C. 154(b) by 106 days.

(21) Appl. No.: 16/377,552

(22) Filed: Apr. 8, 2019

(65) Prior Publication Data
US 2019/0313245 A1    Oct. 10, 2019

Related U.S. Application Data

(60) Provisional application No. 62/653,998, filed on Apr. 6, 2018.

(51) Int. Cl.
| | | |
|---|---|---|
| *H04W 8/30* | (2009.01) | |
| *H04L 1/00* | (2006.01) | |
| *H04L 12/761* | (2013.01) | |
| *H04W 88/08* | (2009.01) | |
| *H04W 76/18* | (2018.01) | |

(52) U.S. Cl.
CPC ............. *H04W 8/30* (2013.01); *H04L 1/0041* (2013.01); *H04L 45/16* (2013.01); *H04W 76/18* (2018.02); *H04W 88/085* (2013.01)

(58) Field of Classification Search
CPC ....................................................... H04W 8/30
See application file for complete search history.

(56) References Cited

U.S. PATENT DOCUMENTS

| | | | | |
|---|---|---|---|---|
| 9,020,059 | B1 * | 4/2015 | Arrobo ................. | H04L 5/0023 375/267 |
| 2014/0269503 | A1 * | 9/2014 | Medard ................. | H04L 1/0077 370/328 |
| 2017/0054526 | A1 * | 2/2017 | Saavedra ............ | H03M 13/154 |

* cited by examiner

*Primary Examiner* — Kodzovi Acolatse
*Assistant Examiner* — The Hy Nguyen
(74) *Attorney, Agent, or Firm* — Molly L. Sauter; Smith & Hopen, P.A.

(57) ABSTRACT

The present invention provides an enhanced DC-NC (eDC-NC) system and method that enables ultra-reliable networking, provides near-instant latency, reduces power consumption while recovering from simultaneous multiple link/node failures and improves the throughput for a wide variety of network architectures.

25 Claims, 9 Drawing Sheets

The bit presentation of $p_1$:
| $b_{1,1}$ | $b_{1,2}$ | $b_{1,3}$ | .... | $b_{1,B}$ | | |

The bit presentation of $p_{1,0}$:
| $b_{1,1}$ | $b_{1,2}$ | $b_{1,3}$ | .... | $b_{1,B}$ | 0 | 0 |

The bit presentation of $p_2$:
| $b_{2,1}$ | $b_{2,2}$ | $b_{2,3}$ | .... | $b_{2,B}$ | | |

The bit presentation of $p_{2,1}$:
| 0 | $b_{2,1}$ | $b_{2,2}$ | $b_{2,3}$ | .... | $b_{2,B}$ | 0 |

The bit presentation of $p_3$:
| $b_{3,1}$ | $b_{3,2}$ | $b_{3,3}$ | .... | $b_{3,B}$ | | |

The bit presentation of $p_{3,2}$:
| 0 | 0 | $b_{3,1}$ | $b_{3,2}$ | $b_{3,3}$ | .... | $b_{3,B}$ |

$$c_1 = p_{1,0} \oplus p_{2,1} \oplus p_{3,2}$$

| $b_{1,1}$ | $b_{1,2}$ | $b_{1,3}$ | | .... | $b_{1,B}$ | 0 | 0 |
| 0 | $b_{2,1}$ | $b_{2,2}$ | $b_{2,3}$ | .... | | $b_{2,B}$ | 0 |
| 0 | 0 | $b_{3,1}$ | $b_{3,2}$ | $b_{3,3}$ | .... | | $b_{3,B}$ |

The ID of $c_1$ is [0, 1, 2]

*FIG. 2*

The bit presentation of $p_1$:
| $b_{1,1}$ | $b_{1,2}$ | $b_{1,3}$ | .... | $b_{1,B}$ | | |

| $b_{1,1}$ | $b_{1,2}$ | $b_{1,3}$ | | .... | $b_{1,B}$ | 0 | 0 |
| 0 | $b_{2,1}$ | $b_{2,2}$ | $b_{2,3}$ | .... | | $b_{2,B}$ | 0 |
| 0 | 0 | $b_{3,1}$ | $b_{3,2}$ | $b_{3,3}$ | .... | | $b_{3,B}$ |

The ID of $c_1$ is [0, 1, 2]

| $b_{1,1}$ | $b_{1,2}$ | $b_{1,3}$ | | .... | $b_{1,B}$ | 0 | 0 |
| 0 | 0 | $b_{2,1}$ | $b_{2,2}$ | $b_{2,3}$ | .... | | $b_{2,B}$ |
| 0 | $b_{3,1}$ | $b_{3,2}$ | $b_{3,3}$ | .... | | $b_{3,B}$ | 0 |

The ID of $c_2$ is [0, 2, 1]

*FIG. 3*

| $b_{1,1}$ | $b_{1,2}$ | $b_{1,3}$ |  |  | .... | $b_{1,B}$ | 0 | 0 |
| --- | --- | --- | --- | --- | --- | --- | --- | --- |
| 0 | $b_{2,1}$ | $b_{2,2}$ | $b_{2,3}$ |  |  | .... | $b_{2,B}$ | 0 |
| 0 | 0 | $b_{3,1}$ | $b_{3,2}$ | $b_{3,3}$ |  |  | .... | $b_{3,B}$ |

The ID of $c_1$ is [0, 1, 2]

| 0 | $b_{1,1}$ | $b_{1,2}$ | $b_{1,3}$ |  |  | .... | $b_{1,B}$ | 0 |
| --- | --- | --- | --- | --- | --- | --- | --- | --- |
| $b_{2,1}$ | $b_{2,2}$ | $b_{2,3}$ |  |  | .... | $b_{2,B}$ | 0 | 0 |
| 0 | 0 | $b_{3,1}$ | $b_{3,2}$ | $b_{3,3}$ |  |  | .... | $b_{3,B}$ |

The ID of $c_3$ is [1, 0, 2]

| 0 | 0 | $b_{1,1}$ | $b_{1,2}$ | $b_{1,3}$ |  |  | .... | $b_{1,B}$ |
| --- | --- | --- | --- | --- | --- | --- | --- | --- |
| 0 | $b_{2,1}$ | $b_{2,2}$ | $b_{2,3}$ |  |  | .... | $b_{2,B}$ | 0 |
| $b_{3,1}$ | $b_{3,2}$ | $b_{3,3}$ |  |  | .... | $b_{3,B}$ | 0 | 0 |

The ID of $c_6$ is [2, 1, 0]

FIG. 7

SYSTEM AND METHOD FOR ENHANCED DIVERSITY AND NETWORK CODING (EDC-NC)

CROSS-REFERENCE TO RELATED APPLICATIONS

This nonprovisional application claims priority to U.S. Provisional Patent Application No. 62/653,998, entitled "System and Method for Enhanced Diversity and Network Coding (eDC-NC)," filed Apr. 6, 2018 by the same inventors, the entirety is incorporated herein by this reference.

BACKGROUND OF THE INVENTION

Improving network reliability and throughput are common goals in wireless network topologies. While Diversity Coding (DC) and Network Coding (NC) are known in the art for improving network reliability and throughput, there is further need in the art for an improved system and method that enhances network reliability by providing near-instant recovery from multiple simultaneous link/node failures. There is an additional need for reduced energy cost while still retaining the throughput improvement features for broadcasting applications while also decreasing the number of redundant links inherent in Diversity Coding.

However, in view of the art considered as a whole at the time the present invention was made, it was not obvious to those of ordinary skill in the field of this invention how the problem could be overcome.

SUMMARY OF THE INVENTION

In various embodiments, the Enhanced Diversity and Network Coding (eDC-NC) system and method of the present invention provides a synergistic combination of the ultra-reliable networking of Diversity Coding (DC) and high throughput gains of Network Coding (NC), for broadcasting applications while providing reduced computational complexity of Triangular Network Coding (TNC). In addition, the eDC-NC system and method of the present invention is capable of recovering from multiple simultaneous link/node failures, nearly instantaneously, and with reduced energy cost, while providing scalable networking with fewer redundant link requirements.

In various embodiments, the present invention can apply to various network technologies, such as, Fronthaul Networks, Sensor Networks, Fog-computing based Radio Access Networks, SDN (Software Defined Networks) and other 5G and Internet of Things (IoT) networks. Additionally, in various embodiments, the present invention may be implemented in wireless networks, wired networks, or in a combination of both wired and wireless networks.

In one embodiment, the present invention provides a method for transmission of data packets over a network. The method includes, generating, a first group of N−1 coded data packets from N uncoded data packets. The method further includes, transmitting each coded packet of the first group of N−1 coded data packets to a first receiving node of two or more receiving nodes of the network over an indirect link and transmitting a first one of the N uncoded data packets to the first receiving node of the two or more receiving nodes over a direct link, transmitting a second one of the N uncoded data packets to a second receiving node of the two or more receiving nodes over a direct link. The method additional includes, receiving the first uncoded data packet and the first group of N−1 coded data packets at the first receiving node and using the uncoded data packet and the first group of N−1 coded data packets at the receiving node to recover the other N−1 uncoded data packets and receiving the second uncoded data packet and the first group of N−1 coded data packets at the second receiving node and using the second uncoded data packet and the first group of N−1 coded data packets at the second receiving node to recover the other N−1 uncoded data packets. As such, in accordance with the method of the present invention, the first group of N−1 coded data packets are used to provide the desired throughput gain for the network.

To provide protection against link failures, the method of the present invention may further include, generating a second group of N−1 coded data packets from the N uncoded data packets, transmitting each coded packet of the second group of N−1 coded data packets to the first and second receiving nodes over indirect links and receiving the second group of N−1 coded data packets at the first receiving node and at the second receiving node. As such, in accordance with the method of the present invention, when one or more link failures occur on one or more of the direct links or indirect links of the network, the second group of N−1 coded data packets are used to recover the N−1 uncoded data packets, thereby providing protection against link failures; however, to provide full protection against link/node failures, one more coded data packet will be required (i.e. the second group of N−1 coded data packets plus one more coded data packet).

In another embodiment, the present invention provides a transmission system for a network, which includes, a plurality of transmitting nodes and two or more receiving nodes in a network. In this embodiment, each of the transmitting nodes are configured for transmitting its data packet to an intermediate node, which is called an eDC-NC encoding node for generating a first group of N−1 coded data packets from N uncoded data packets, transmitting each coded packet of the first group of N−1 coded data packets to the receiving nodes of the network over indirect links. In addition, a first transmitting node transmits a first one of the N uncoded data packets to the first receiving node of the two or more receiving nodes over a direct link and a second transmitting node of the transmitting nodes is transmitting a second one of the N uncoded data packets to a second receiving node of the two or more receiving nodes over a direct link. Each of the receiving nodes are further configured for receiving the first uncoded data packet and the first group of N−1 coded data packets at the first receiving node and using the uncoded data packet and the first group of N−1 coded data packets at the receiving node to recover the other N−1 uncoded data packets and receiving the second uncoded data packet and the first group of N−1 coded data packets at the second receiving node and using the second uncoded data packet and the first group of N−1 coded data packets at the second receiving node to recover the other N−1 uncoded data packets. As such, in the system of the present invention, the first group of N−1 coded data packets are used to provide the desired throughput gain for the network.

The eDC-NC encoding node in the system may further be configured for generating a second group of N−1 coded data packets from the N uncoded data packets and transmitting each coded packet of the second group of N−1 coded data packets to the receiving nodes over indirect links. Additionally, each of the receiving nodes in the system may be further configured for receiving the second group of N−1 coded data packets at the first receiving node and at the second receiving node and when one or more link failures occur on one or more of the direct links or indirect links of the network, using the second group of N−1 coded data packets to recover the N−1 uncoded data packets. As such, in the system of the present invention, when one or more link failures occur on one or more of the direct links or indirect links of the network, the second group of N−1 coded data packets are used to recover the N−1 uncoded data packets, thereby providing protection against link failures; however, to provide full protection against link/node failures, one more coded data packet will be required (i.e. the second group of N−1 coded data packets plus one more coded data packet).

In an additional embodiment, the present invention provides one or more non-transitory computer-readable media having computer-executable instructions for performing a method of running a software program on a computing device, the computing device operating under an operating system, the method including issuing instructions from the software program comprising, generating, at a transmitting node (for a point-to-multipoint network topology) or at an eDC-NC encoding node (for multipoint-to-multipoint network topology) of a network, a first group of N−1 coded data packets from N uncoded data packets, transmitting each coded packet of the first group of N−1 coded data packets to a first receiving node of two or more receiving nodes of the network over an indirect link, transmitting a first one of the N uncoded data packets to the first receiving node of the two or more receiving nodes over a direct link and transmitting a second one of the N uncoded data packets to a second receiving node of the two or more receiving nodes over a direct link. The media further includes instructions for receiving the first uncoded data packet and the first group of N−1 coded data packets at the first receiving node and using the uncoded data packet and the first group of N−1 coded data packets at the receiving node to recover the other N−1 uncoded data packets and receiving the second uncoded data packet and the first group of N−1 coded data packets at the second receiving node and using the second uncoded data packet and the first group of N−1 coded data packets at the second receiving node to recover the other N−1 uncoded data packets. As such, in the present invention, the media stores instructions whereby a first group of N−1 coded data packets are used to provide the desired throughput gain for the network.

The media may further includes instructions for generating, at the transmitting node (for a point-to-multipoint network topology) or at an eDC-NC encoding node (for multipoint-to-multipoint network topology) of the network, a second group of N−1 coded data packets from the N uncoded data packets, transmitting each coded packet of the second group of N−1 coded data packets to the receiving nodes over indirect links, receiving the second group of N−1 coded data packets at the first receiving node and at the second receiving node and when one or more link failures occur on one or more of the direct links or indirect links of the network, using the second group of N−1 coded data packets to recover the N uncoded data packets. Accordingly, the media of the present invention stores instructions whereby, when one or more link failures occur on one or more of the direct links or indirect links of the network, the second group of N−1 coded data packets are used to recover the N−1 uncoded data packets, thereby providing protection against link failures; however, to provide full protection against link/node failures, one more coded data packet will be required (i.e. the second group of N−1 coded data packets plus one more coded data packet).

In the various embodiments, the present invention improves network reliability with near-instant recovery from multiple simultaneous link/node failures, provides reduced energy cost for recovering from multi-link/node failures due to its lower computation complexity, and improved throughput.

BRIEF DESCRIPTION OF THE DRAWINGS

For a fuller understanding of the invention, reference should be made to the following detailed description, taken in connection with the accompanying drawings, in which:

FIG. 2 illustrates the eDC-NC generation scheme for the coded packet $c_1$, in accordance with an embodiment of the present invention.

FIG. 3 illustrates an example of the decoding process in eDC-NC, in accordance with an embodiment of the present invention.

FIG. 7 illustrates an exemplary decoding process in TNC, in accordance with an embodiment of the present invention.

DETAILED DESCRIPTION OF THE INVENTION

Figure 1:
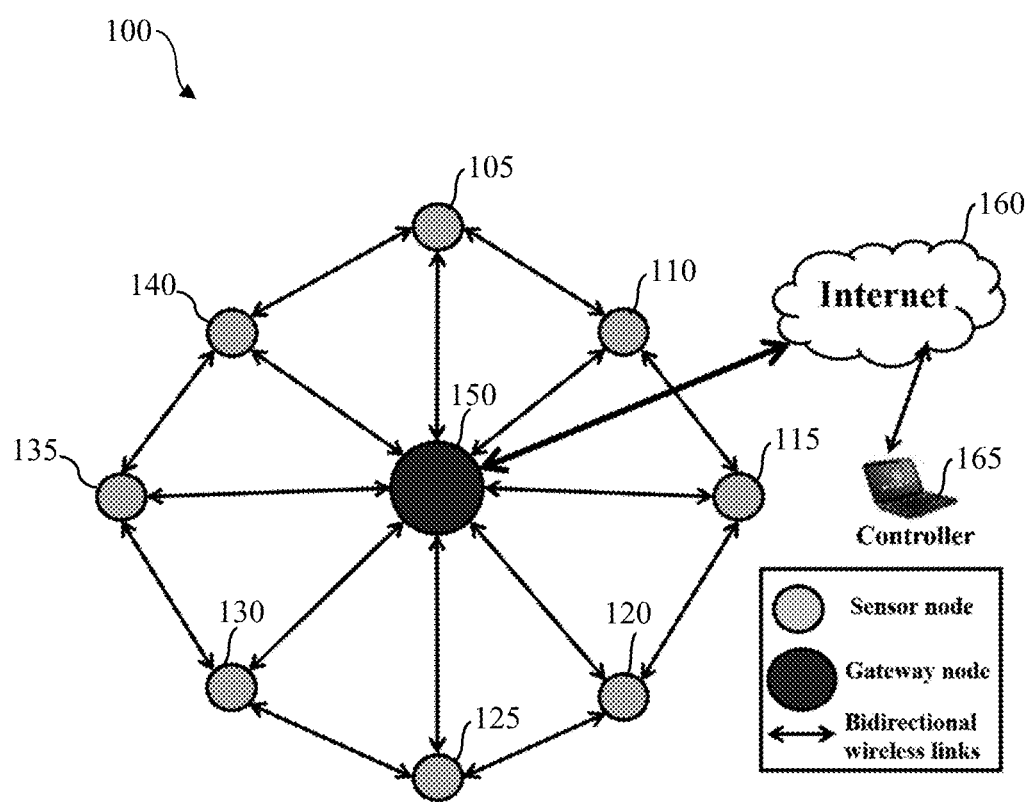
FIG. 1 illustrates a wireless sensor network having a mesh topology, in accordance with an embodiment of the present invention.

In one embodiment, a system and method for enhanced DC-NC (eDC-NC) coding in accordance with the present invention, is implemented in ultra-reliable and energy efficient wireless sensor networks and is based on a novel enhancement and synergistic combination of Diversity Coding (DC) and modified Triangular Network Coding (TNC).

Diversity Coding (DC) enables reliable networking with near near-instant recovery from a link where a feed forward network design uses forward error control across spatially diverse paths at the expense of redundant transmission facilities. Network Coding (NC) uses coding at a network node to improve network throughput and save system bandwidth for data broadcasting applications.

In an exemplary embodiment, near instant link failure recovery and lower energy consumption can be achieved via the synergistic combination of Diversity Coding (DC) and modified Triangular Network Coding (eDC-NC), an open-loop coding technique, in a wide variety of network architectures. In one exemplary embodiment, eDC-NC is applied to Wireless Sensor Networks (WSNs) to enable very rapid recovering from wireless link/node failures and to provide low computational cost and reduced energy cost, which are very important metrics for WSNs. Utilizing the eDC-NC coding method of the present invention in WSNs can provide ultra-reliability network connectivity with very rapid fault recovery, decreased energy consumption and an increased network throughput for broadcasting applications.

As is known in the art, a Wireless Sensor Network (WSN) contains one or more gateway nodes, or central controllers, and several sensor nodes that are implemented at different locations. Each sensor node contains a sensor with the ability to monitor a specific kind of condition at a particular location, such as temperature, pressure, noise levels, etc. Very low energy consumption, as well as high throughput and ultra-reliability are required for the sensors of a WSN. Transmission link failures and sensor node failures are the principle contributors to the reduction in system throughput and decreased reliability of the network. In addition, a sensor node has limited processing and energy capacity, thereby weakening the ability of the network to recover from wireless link/node failures.

In this embodiment of present invention, these two challenges are addressed and overcome for WSNs. While it is known that network reliability can be improved by utilizing multiple sensor nodes that transmit the same collected information to multiple gateway nodes, doing so increases the redundancy by 100%, while also increasing the power consumption, resulting from multiple transmissions of the same data. A more efficient approach known in the art is Diversity Coding (DC), which is a forward error control technique utilizing diverse transmission routes, thereby providing the ability to recover from wireless link failures as soon as the failure is detected, with no need to retransmit messages and perform rerouting. DC improves reliability with low energy consumption and minimal added complexity.

Diversity Coding (DC) has been utilized to improve the reliability of WSNs with minimum energy cost. Also, DC has been shown to enhance C-RAN (Cloud Radio Access Network) network performance by improving reliability with fast link/node failure recovery. In addition, it has been shown that multiple simultaneous link failures can be recovered via Diversity Coded systems. Although reliability is very important in WSNs, energy consumption and throughput are other important factors that affect WSN performance. Triangular Network Coding (TNC), which is a specific mode of Network Coding (NC), has the ability to minimize energy consumption while providing higher throughput, because its computational complexity is lower than other NC schemes.

It is also known that reliability, throughput, and energy consumption are simultaneously enhanced for wireless fronthaul networks by DC-NC coding, a synergistic combination of Diversity Coding (DC) and Network Coding (NC). However, the DC-NC coding scheme depends on deterministically chosen coefficients from a finite (Galois) field and the computational complexity will increase dramatically with an increased number of broadcasted packets and/or the number of link failures that need to be protected. This will increase the energy cost of link failure recovery, as DC-NC coding requires increasing the finite field (GF) size. Consequently, the coding process will consume more energy, as it relies on matrix inversion.

There are several topologies that can be used to build WSNs networks, including, but not limited to, a star or mesh topology and multi-hop wireless mesh topologies. In addition, several wireless techniques can be used for WSN communications. A sensor node in a WSN has the ability to receive sensed data and forward the information to the gateway, either directly or via other sensor nodes in the WSN. The gateway, which works as a bridge between the WSN and other external networks, transmits the information collected by the sensor nodes to the external network. The WSN can contain a few to several thousands of nodes and a battery is typically utilized as the energy source for these nodes. Sensor nodes often have limited resources such as memory, energy and computational capability, which may affect the reliability of the WSN. Accordingly, it is necessary to design very low computational complexity and ultra-low energy techniques that improve the reliability of the WSN when link and/or node failures occur. Since the method of the present invention employing eDC-NC, which has very low computational complexity and ultra-low energy cost, the method increases the reliability of a WSN.

As shown in FIG. 1, a WSN 100 may have a multi-hop mesh topology, where sensor nodes 105, 110, 115, 120, 125, 130, 135, 140 are connected to each other by wireless links. The collected data is transmitted from the sensor nodes 105, 110, 115, 120, 125, 130, 135, 140 to the gateway node 150 and commands and other information is transmitted from the gateway 150 to the sensor nodes 105, 110, 115, 120, 125, 130, 135, 140. The gateway 150 may then send the collected data over the internet 160 and a controller 165 may be implemented to provide commands to the sensors 105, 110, 115, 120, 125, 130, 135, 140 using the gateway node 150. In the following exemplary embodiment of the present invention, an uplink scenario is described, wherein a sensor node sends the data collected at its location to one or more gateway nodes.

Diversity Coding, Network Coding, and DC-NC coding generally use a finite Galois Field, denoted by $GF(2^m)$ where $m \geq 1$, to select the required coefficients for coding the data packets to be transmitted from the sensor nodes to the gateway nodes. Therefore, high encoding and decoding computational complexity will be required as the number of broadcasted packets and/or the number of coded packets increases, since "m" increases. As such, the field $GF(2^m)$ also increases and the dimension of the coding and decoding matrices will also be increased. However, linear encoding and decoding over GF(2), where m=1, has the ability to decrease computational complexity. However, linear encoding and decoding is unable to generate more than one coded packet. The method for Enhanced DC-NC (eDC-NC) coding in accordance with the present invention can decrease the encoding and decoding computational complexity. The key idea of the eDC-NC method is to add a string of "0" bit(s) to each data packet such that an XOR operation between the packets will result in a new coded packet.

To illustrate the principle of eDC-NC coded packet generation and the associated decoding schemes, assume that the number of packets N=3, and the packets are $p_1$, $p_2$, and $p_3$. Each packet has B bits so that the packet bit pattern is $p_i = \{b_{i,1} \; b_{i,2} \; \ldots \; b_{i,B}\}$, where i is the packet number. To generate the first coded packet, $c_1$, N−1 redundant bits "0", which are called are required.

FIG. 2 illustrates the generation of the coded packet $c_1$ where no redundant bit "0" is added at the head of packet $p_1$ and hence, it is denoted by $p_{1,0}$. A redundant bit "0" is added at the head of packet $p_2$ and hence, it is denoted by $p_{2,1}$. In addition, two redundant bits "0" are added at the head of packet $p_3$ and hence, it is denoted by $p_{3,2}$. To equalize the length of all packets, two "0" bits are added to the tail of packet $p_1$ and a "0" bit is added to the tail of $p_2$. Therefore, in general, each packet will be denoted by $p_{i,r_i}$, where $r_i$ is the number of redundant bit(s) "0" that are added at the head of packet i. A simple XOR operation between $p_{1,0}$, $p_{2,1}$, and $p_{3,2}$, will generate the first coded packet, $c_1$. The unique ID of a coded packet is represented as $[r_1, r_2, r_3]$. Hence, the unique ID of $c_1$ is [0, 1, 2], which in general is given by [0, 1, ..., N−1]. To generate the second coded packet, $c_2$, the position of "0" in the first ID will be fixed and all the other terms will be cyclically rotated. Hence, the second coded packet's ID will be [0, 2, 1]. In this way, the first group of N−1 coded packets can be generated.

To generate the second group of N−1 coded packets, the new ID will be [0, the smallest integer greater than $r_{max}$ at the previous group ($r_{2_\alpha}$), $r_{2_\alpha}+\alpha$, ..., $r_{2_\alpha}+\alpha(N-2)$], where α represents the group number. In eDC-NC coding, only (N−1) coded packets for NC are required to get the throughput gain and N coded packets for DC are required to get full protection of the network. Hence, the maximum number of required coded packets will be (2N−1). Therefore, to broadcast 3 packets and tolerate 2 link failures for each destination node, four coded packets with the following IDs are required:

$$ID_{c_1}=[0,1,2], ID_{c_2}=[0,2,1],$$

$$ID_{c_3}=[0,3,5], ID_{c_4}=[0,5,3].$$

Hence, first group of coded packets can be expressed as $$c_1 = p_{1,0} \oplus p_{2,1} \oplus p_{3,2}, \quad (1)$$

$$c_2 = p_{1,0} \oplus p_{2,2} \oplus p_{3,1}, \quad (2)$$

And, second group of coded packets can be expressed as $$c_3 = p_{1,0} \oplus p_{2,3} \oplus p_{3,5}, \quad (3)$$

$$c_4 = p_{1,0} \oplus p_{2,5} \oplus p_{3,3}, \quad (4)$$

The decoding process is simple and is performed by bit by bit XOR back substitution.

FIG. 3 is an example of recovering the packets $p_2$ and $p_3$ in the presence of packet $p_1$ and coded packets $c_1$ and $c_2$. The bit representation of $p_1$ and each coded packet is shown in FIG. 3. Each encoded packet is represented by a table where each row lists the bits of a packet involved in the encoding.

A separate XOR operation between $p_1$ and both available coded packets will be performed as illustrated below:

| 0 | $b_{2,1}$ | $b_{2,2}$ | $b_{2,3}$ | ... | $b_{2,B}$ | 0 |
|---|---|---|---|---|---|---|
| 0 | 0 | $b_{3,1}$ | $b_{3,2}$ | $b_{3,3}$ | ... | $b_{3,B}$ |

Coded packet $c_1$ after XOR operation with $p_1$

| 0 | 0 | $b_{2,1}$ | $b_{2,2}$ | $b_{2,3}$ | ... | $b_{2,B}$ |
|---|---|---|---|---|---|---|
| 0 | $b_{3,1}$ | $b_{3,2}$ | $b_{3,3}$ | ... | $b_{3,B}$ | 0 |

Coded packet $c_2$ after XOR operation with $p_1$

Starting from the left, the first bit from both coded packets will be neglected as both are "0". The second bit of $c_1$ is encoded by $b_{2,1} \oplus 0$ which equals $b_{2,1}$. Similarly, $b_{3,1}$ can be recovered from the second bit of $c_2$. Now, the decoding process proceeds to the third bit position of both coded packets. By substituting $b_{2,1}$ into $c_2$ and $b_{3,1}$ into $c_1$, $b_{2,2}$ and $b_{3,2}$ can be recovered directly. Going forward to the fourth bit position, bits $b_{2,3}$ and $b_{3,3}$ can be instantly obtained by substitution. All unknown bits can be obtained by continuing the decoding process. In this way, the bits of packets $p_2$ and $p_3$ can be decoded by back substitution at the bit level. In this way, enhanced DC-NC coding can provide ultra-low energy cost and minimal computational complexity.

Wireless Sensor Network (WSN) resource limitations, such as energy and transmission bandwidth, in the presence of link/node failures, can cause degradation in throughput and reliability. Enhanced DC-NC is a promising technology to maximize the reliability of WSNs while enabling ultra-low energy cost for link/node failures recovery and increased throughput in broadcast applications.

Figure 4:
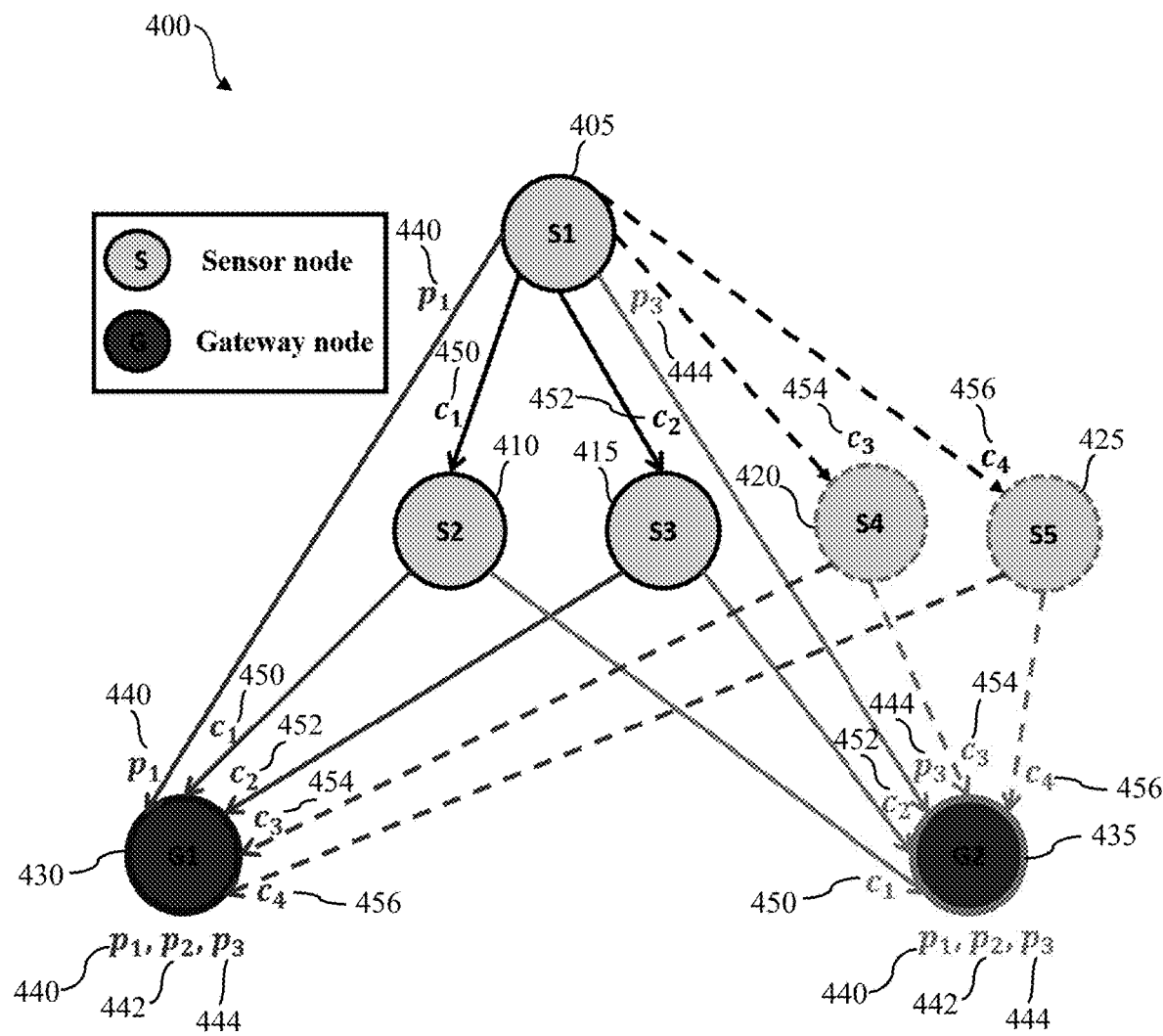
FIG. 4 is a diagram illustrating an example of eDC-NC coding to broadcast three packets to nodes G1 and G2 applied to a WSN (Wireless Sensor Network), where solid lines represent the links that carry coded packets and are used to improve network throughput and dashed lines represent the links that carry coded packets and are used to maximize network reliability, in accordance with an embodiment of the present invention.

The eDC-NC coding is applied to a WSN network 400 as illustrated in FIG. 4. Here, bi-directional wireless links connect sensor nodes 405, 410, 415, 420, 425 and gateway nodes 430, 435 to each other in a mesh topology. An uplink point-to-multipoint network topology models the broadcasting of three packets $p_1$ 440, $p_2$ 442, $p_3$ 444 from the sensor node S1 405 to two gateways G1 430 and G2 435. It is assumed that these two gateways are working in active/stand by (ACT/STBY) mode to eliminate single points of failure and to make sure that the required information is collected from the sensor nodes, even if one gateway fails for any reason, the collected data will still arrive at the user. Utilizing the eDC-NC coding scheme, four disjoint routes are needed to broadcast three packets from the sensor node to two gateway nodes. In addition, two more disjoint paths are used to tolerate two link failures at each gateway node. Using direct links, packets $p_1$ 440 and $p_3$ 444 are transmitted from S1 405 to G1 430 and G2 435, respectively. To obtain the throughput gain and tolerate 2 link failures for each destination node, four coded packets, $c_1$ 450, $c_2$ 452, $c_3$ 454 and $c_4$ 456 are formed at S1 405 as shown in equations (1)-(4) and then sent to S2 410, S3 415, S4 420 and S5 425, respectively. To obtain the throughput gains, S2 410 and S3 415 transmit $c_1$ 450 and $c_2$ 452, respectively, to G1 430 and G2 435. Coded packets $c_1$ 450 and $c_2$ 452 in addition to the packet $p_1$ 440 are decoded at G1 430 to obtain $p_2$ 442 and $p_3$ 444. Similarly, $c_1$ 450, $c_2$ 452 and $p_3$ 444 are decoded at G2 435 to obtain $p_1$ 440 and $p_2$ 442. In this way, the throughput gains in this example network are improved by at least 20%.

Wireless sensor network reliability in the presence of link failures, can be improved by transmitting $c_3$ 454 and $c_4$ 456 from S4 420 and S5 425, respectively to G1 430 and G2 435. The coded packets $c_3$ 454 and $c_4$ 456 will be ignored when there are no link failures. In the presence of a link failure, for example if the link from the S1 405 to G1 430 fails, G1 430 detects the failure then recovers $p_1$ 440, $p_2$ 442 and $p_3$ 444 by utilizing $c_1$ 450, $c_2$ 452 and $c_3$ 454 using the back-substitution method. In addition, if $c_1$ 450 is lost, G1 435 has $p_1$ 440, $c_2$ 452 and $c_3$ 454 and can quickly and easily recover $p_2$ 442 and $p_3$ 444. Furthermore, if two links fail at G1 430, for example $p_1$ 440 and $c_1$ 450, G1 430 detects the failures then recovers $p_1$ 440, $p_2$ 442 and $p_3$ 444 by utilizing $c_2$ 452, $c_3$ 454 and $c_4$ 456, in the same manner as previously described. Similarly, any two link failures can be recovered in the same way.

Moreover, in addition to providing recovery for multiple link failures, two intermediate node failures such as S2 410 and S3 415 can be tolerated since this corresponds to four simultaneous link failures where each pair is associated with a different destination node. Also, when failures occur at S4

420 and S5 425, $c_3$ 454 and $c_4$ 456 will be lost i.e. protection of the network but, if these are the only failures, successful data communication can still be achieved.

In general, eDC-NC networks in accordance with the present invention can tolerate n link failures for each destination node at k destination nodes, however, kn+n redundant links are required, where n≤N. The recovery time is lower bounded by the time to detect a failure.

The previously described embodiment of the coding method of the present invention, eDC-NC, that synergistically combines Diversity and modified Triangular Network Coding, improves the performance of WSNs. It has been demonstrated that eDC-NC can provide simultaneous recovery from multiple link/node failures, nearly-instantaneously, with minimum energy consumption. Furthermore, eDC-NC networks can tolerate n link failures, where n is less than or equal to the number of broadcasted packets for each receiver node at k receiver nodes, with kn+n redundant links. Applying the eDC-NC method of the present invention minimizes the energy cost of recovering from multiple wireless link/node failures due to its less computational complexity, while simultaneously improving the throughput in the network by at least 20%, in this exemplary embodiment.

In another exemplary embodiment, the present invention provides a near-instant link failure recovery in a 5G wireless Fog-Based-Fronthaul Network. In this embodiment, the DC-NC methodology is further enhanced to achieve near-instant recovery from multiple, simultaneous wireless link failures by modifying Triangular Network Coding (TNC) to create enhanced DC-NC (eDC-NC) that is applied to 5G wireless Fog computing based Radio Access Networks (F-RANs). In addition, an explicit method for the eDC-NC decoding process is provided. The results demonstrate that applying eDC-NC coding to a F-RAN fronthaul network will provide ultra-reliability, enable near-instantaneous fault recovery, and enhance the throughput by at least 20% (for three broadcasted data streams).

Numerous applications in 5G wireless communication systems are required to be ultra-reliable and very efficient with ultra-low latency communications. This exemplary embodiment describes a methodology for rapid recovery from link or node failures in the fronthaul networks of 5G Fog Radio Access Networks (F-RANs). F-RANs are an enhancement and an alternative to Cloud Radio Access Network (C-RAN). The key idea of F-RAN is to employ edge nodes with the ability to store data, control signals, and communicate to each other instead of centralizing processing in the baseband unit (BBU) at the C-RAN. Diversity Coding (DC), an open loop coding technique, can help address this challenge and is a forward error control technology over diverse routes. With DC once the failure is detected the lost message can be rapidly recovered without performing rerouting and/or retransmission.

It is known that DC can be used to improve the reliability of a C-RAN network with the ability to tolerate multiple simultaneous link failures. Diversity Coding has been described to improve the reliability of OFDM-based vehicular systems and sensor networks. Network Coding (NC) has the ability to further improve 5G wireless F-RAN performance by increasing its throughput. Triangular Network Coding (TNC) is another mode of NC that can be used for this purpose with less computational complexity.

DC-NC coding, a synergistic combination of Diversity Coding (DC) and Network Coding (NC), can simultaneously enhance wireless network reliability, provide high throughput and enable low latency 5G communications systems. DC-NC coding can be easily integrated into the state-of-art F-RAN by deploying relay nodes that are configured to enable DC-NC coding.

The contributions of the present invention are modifying TNC to enhance DC-NC coding and applying enhanced DC-NC coding (eDC-NC) to F-RAN wireless networks to improve their reliability with reduced computational complexity, provide extremely low recovery time for simultaneous multiple link failures, and to increase throughput for broadcasting or multicasting applications. In addition, an explicit algorithm for eDC-NC decoding process is presented.

Figure 5:
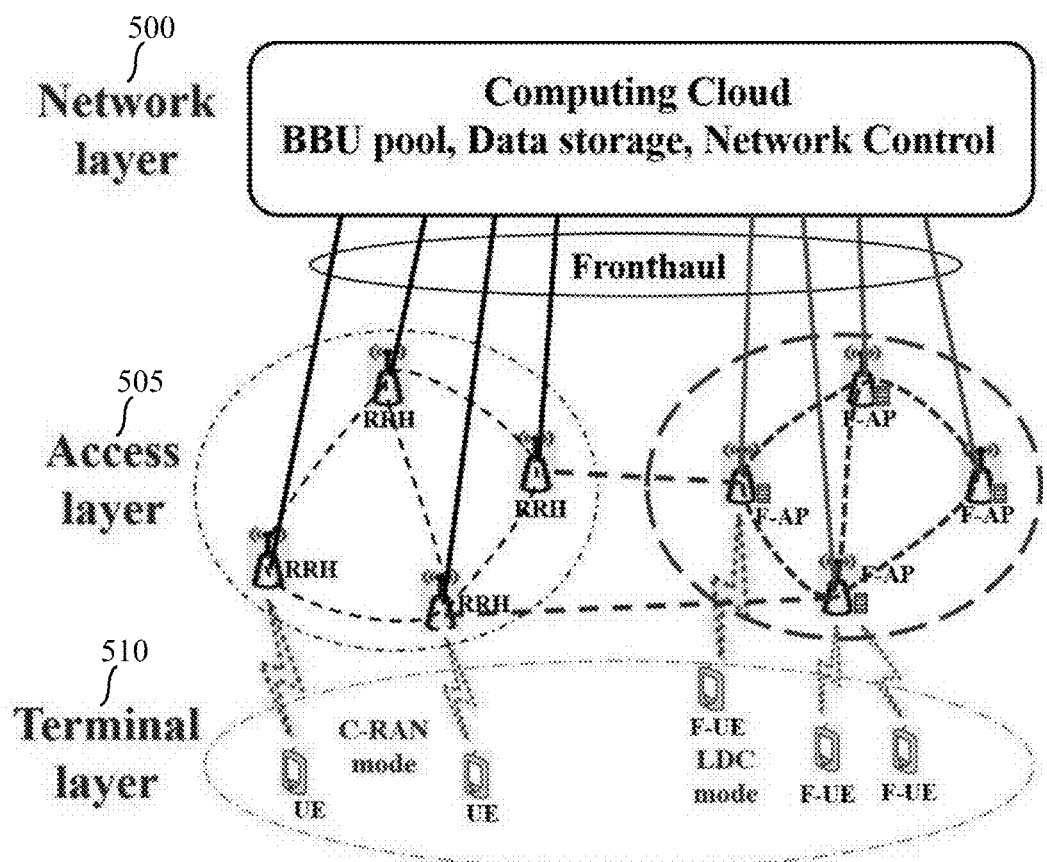
FIG. 5 illustrates a F-RAN (Fog computing based Radio Access Network) network architecture, in accordance with an embodiment of the present invention.

F-RANs have been proposed to improve the performance of C-RANs by migrating a significant number of functions to the edge device and substantially upgrading the Remote Radio Heads (RRHs). These functions include controlling, communicating, measuring, managing, and storing data. In this way, an upgraded RRH is called a Fog Access Point (F-AP), and will be able to communicate and network with other F-APs and this architecture will reduce latency by performing functionality at the network edge rather than in the core. The F-RAN architecture consists of three layers, as shown in FIG. 5. The Baseband Unit (BBU) pool, network control and centralized storage provide the network layer functions 500. The access layer 505 contains RRHs and F-APs. The terminal layer 510 includes user equipment (UE) and Fog UE (F-UE) that access F-AP. The F-APs can be formed into two topologies: a mesh topology and a tree-like topology. Both topologies can significantly minimize the degrading effects of capacity-constrained fronthaul links.

Different transmission modes can be used in a F-RAN, such as the C-RAN and Local Distributed Coordination (LDC) modes, as illustrated in FIG. 5. The core mode for the F-RAN is the LDC mode and the C-RAN mode is similar to that in a C-RAN, where control signals, data storage, and computing processes are centralized in the BBU pool. In LDC, the F-APs communicate with other F-APs to serve the F-UEs. These transmission modes can work together to serve both UEs and F-UEs. For example, when a UE requests data that is stored in one of the F-APs, the RRH will send its request to the BBU then the BBU instead of sending the requested data, which increases the burden on the fronthaul network, will order the F-AP to send the requested data to the UE via the RRH. In this way, the burden on the fronthaul network will be decreased. Hence, the interference can be quickly suppressed, and the required data will be sent to the F-UE and UE (via RRHs) not from the cloud server but from the F-APs.

Figure 6:
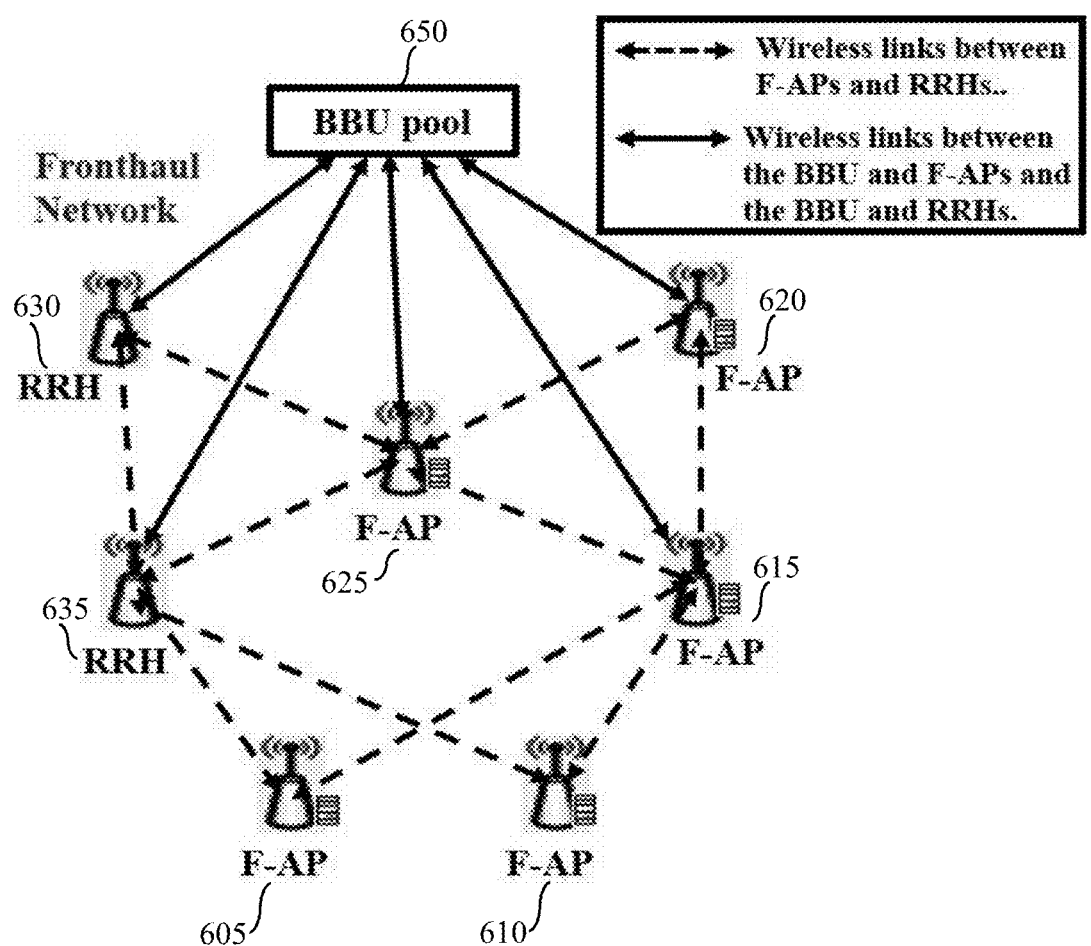
FIG. 6 illustrates an exemplary F-RAN fronthaul network with wireless links, in accordance with an embodiment of the present invention.

In this exemplary embodiment, the eDC-NC coding method was applied to a combination of the C-RAN and LDC transmission modes in a fronthaul network 650, where F-APs 605, 610, 615, 620, 625 and RRHs 630, 635 are connected to each other in a mesh topology, as shown in FIG. 6. Here, these connections are assumed to be wireless links. MIMO technology will likely be used by the F-APs and RRHs to decrease interference and be able to communicate with each other.

Network Coding (NC) over a large finite field results in high encoding and decoding computational complexity. However, linear encoding and decoding over GF(2) can minimize computational complexity, but is not being able to generate more than one coded data stream. Triangular Network Coding (TNC) is a mode of NC that has the ability to decrease the encoding and decoding computational complexity of LNC. The key idea of TNC is adding a string of "0" bit(s) on each data stream such that the XOR operation between the data streams will result a new coded data stream.

To illustrate the principle of TNC, it is assumed that the number of data streams N=3, and the data streams are $d_1$, $d_2$, and $d_3$. Each data stream has B bits so that the bit pattern of each data stream is $d_i=\{b_{i,1}\ b_{i,2}\ \ldots\ b_{i,B}\}$ where i is the data stream number. To generate the first coded data stream, N−1 redundant bits "0", which is called $r_{max}$ are required. No redundant bit "0" is added at the head of data stream $d_1$ and hence, it is denoted by $d_{1,0}$. A redundant bit "0" is added at the head of data stream $d_2$ and hence, it is denoted by $d_{2,1}$. In addition, two redundant bits "0" are added at the head of data stream $d_3$ and hence, it is denoted by $d_{3,2}$. To equalize the length of all data streams, Two "0" bits are added to the tail of data stream $d_1$ and a "0" bit is added to the tail of $d_2$. Therefore, in general, each data stream will be denoted by $d_{i,r_i}$, where $r_i$ is the number of redundant bit(s) "0" that are added at the head of data stream i. A simple XOR operation between $d_{1,0}$, $d_{2,1}$, and $d_{3,2}$, will generate the first coded data stream, $c_1$. The unique ID of the encoded data stream is represented as $[r_1, r_2, r_3]$. Hence, the unique ID of $c_1$ is [0, 1, 2], which in general is given by [0, 1, . . . , N−1]. To generate the second coded data stream, the position of "0" in the first ID will be fixed and all the other terms will be cyclically rotated. Hence, the second coded data stream's ID will be [0, 2, 1]. In this way, N−1 coded data streams can be generated. To generate another N−1 coded data streams, the position of "0" in the first ID will be changed to be in the second position such that the ID will be [1, 0, . . . , N−1] and all other terms except "0" will be rotated. With N positions for "0" to be fixed, N×(N−1) coded data streams can be generated. So that in our example, 3×(3−1)=6 coded data streams can be generated. To generate another group of N×(N−1) coded data streams, the new ID will be [0, 2, . . . , 2(N−1)], which is similar to the first ID with each $r_i$ multiplied by a constant α=2. In similar way, another N×(N−1) coded data streams can be generated with α=3, 4, 5, . . . with no limit except that higher α results in a larger redundant bits "0". It is known that the decoding process can be easily done by bit-by-bit XOR back substitution. Below is a simple example to extract the required raw data streams from codes with IDs: $ID_{c_1}=[0, 1, 2]$, $ID_{c_3}=[1, 0, 2]$, $ID_{c_6}=[2, 1, 0]$. The bit representation of each code is shown in FIG. 7.

Each encoded data stream is represented by a table where each row lists the bits of a data stream involved in the encoding. Starting from the left the first bit of $c_1$ is encoded by $b_{1,1} \oplus 0 \oplus 0$ which equals $b_{1,1}$. Similarly, $b_{2,1}$ and $b_{3,1}$ can be recovered from the first bit of $c_3$ and $c_6$ respectively. Now, the decoding process proceeds to the second bit position of the 3 coded data streams. By substituting $b_{1,1}$ into $c_3$ and $b_{2,1}$ into $c_1$ and $c_6$, $b_{2,2}$, $b_{1,2}$, and $b_{3,2}$ can be recovered directly. Going forward to the third bit position, bits $b_{1,3}$, $b_{2,3}$, and $b_{3,3}$ can be instantly obtained by substitution. All unknown bits can be obtained by continuing decoding process. In this way, the bits of all 3 data streams can be decoded by back substitution at the bit level. However, TNC cannot work as described above if there is a raw (original) data stream in the receiver node as will be explained below.

The DC-NC coding scheme depends on deterministically chosen coefficients from a finite (Galois) field and the computational complexity will increase dramatically with an increased number of broadcasted data streams and/or the number of link failures that need to be protected. This will increase the link failure recovery time as it requires increasing the finite (Galois) field size. Consequently, the decoding process will consume more time as it includes matrix inversion. To address these issues, the DC-NC coding is modified such that the encoding and decoding processes will be over GF(2), which means a simple XOR operation for coding and decoding.

As detailed below, the modification of TNC is explained and utilized to enhance DC-NC coding (dubbed eDC-NC). First, it is shown that, in the presence of a raw (i.e., uncoded in by DC or NC) data stream at the destination, which is generally the case in DC-NC networking, TNC cannot recover the other required data streams. Based on the example that is provided, the first six IDs of the coded data streams will be as follows:

$$ID_{c_1}=[0,1,2], ID_{c_2}=[0,2,1], ID_{c_3}=[1,0,2],$$

$$ID_{c_4}=[2,0,1], ID_{c_5}=[1,2,0], ID_{c_6}=[2,1,0].$$

Now, assuming that the receiver node has the raw data stream $d_3$ and it received $c_1$ and $c_5$. To recover $d_1$ and $d_2$, A separate XOR operation between $d_3$ and both received coded data streams will be performed as illustrated below:

| $b_{1,1}$ | $b_{1,2}$ | $b_{1,3}$ |     | $b_{1,B}$ | 0 | 0 |
|---|---|---|---|---|---|---|
| 0 | $b_{2,1}$ | $b_{2,2}$ | $b_{2,3}$ | ... | $b_{2,B}$ | 0 |

Coded data stream $c_1$ after XOR operation with $d_3$

| 0 | $b_{1,1}$ | $b_{1,2}$ | $b_{1,3}$ |     | $b_{1,B}$ | 0 |
|---|---|---|---|---|---|---|
| 0 | 0 | $b_{2,1}$ | $b_{2,2}$ | $b_{2,3}$ | ... | $b_{2,B}$ |

Coded data stream $c_5$ after XOR operation with $d_3$.

It is clear that both data streams are similar and hence, the bit level back substitution scheme described above will not work, since only the bit $b_{1,1}$ can be obtained from both tables of coded data streams. Therefore, $d_1$ and $d_2$ cannot be recovered. Table I shows other cases that can lead to the same problematic result.

TABLE I

OTHER PROBLEMATIC CASES FOR TNC

| Available raw data stream | Coded data streams | |
|---|---|---|
|  | First code & its ID | Second code & its ID |
| $d_1$ | $c_1$ [0, 1, 2] | $c_4$ [2, 0, 1] |
| $d_1$ | $c_2$ [0, 2, 1] | $c_6$ [2, 1, 0] |
| $d_2$ | $c_2$ [0, 2, 1] | $c_3$ [1, 0, 2] |
| $d_2$ | $c_4$ [2, 0, 1] | $c_5$ [1, 2, 0] |
| $d_3$ | $c_3$ [1, 0, 2] | $c_6$ [2, 1, 0] |

TNC needs to be modified to be able to recover the required data streams when there is a raw data stream at the receiver nodes. The required data streams can be recovered when the coded data streams with a zero that is fixed in only one position in their IDs are used. However, only (N−1) coded data streams can be generated with one position for "0" to be fixed. As discussed above, utilizing the same methodology used in TNC to produce another group of coded data streams, will not work with a raw data stream in the destination nodes. Therefore, to produce another group of (N−1) coded data, the new ID should be [0, the smallest integer greater than $r_{max}$ at the previous group ($r_{2_α}$), $r_{2_\alpha}+\alpha, \ldots, r_{2_\alpha}+\alpha(N-2)]$, where $\alpha$ represents the group number. This represents the general coded data stream IDs for $\alpha>1$.

A general notation to generate the encoded data streams such that they can work perfectly with or without raw data stream may be derived. The coded data stream can be expressed as:

$$c_i = d_{1,0} \oplus_{r=1}^{N-1} d_{[i-(\alpha-1)(N-1)+r+\delta]mod(N),[\alpha r+(\alpha-1)(N-2)]} \quad (5)$$

for $1 \leq i \leq 2(N-1)$, where $$\delta = \begin{cases} 0 & \text{if } i-(\alpha-1)(N-1)+r \leq N \\ 1 & \text{elsewhere} \end{cases},$$

In addition, d is the raw data stream and $\alpha$ is either 1 or 2. In this way, $2(N-1)$ coded data streams can be generated.

Generally, in DC-NC coding, only $(N-1)$ coded data streams for NC are required to realize the throughput gain and N coded data streams for DC are required to get a fully protected network (i.e. the system can recover from a number of link failures equal to the number of transmitted data streams at each destination node). However, using (5), $(N-1)$ coded data streams are generated for NC and another $(N-1)$ coded data streams are generated for DC, which means one more coded data stream must be generated to get a fully protected DC-NC network. The last coded data stream, which belongs to the third group of coded data streams can be generated, when it is required, from the general coded data stream's ID representation that is shown above. Note that the fully protected network is not always required or preferred because it requires additional redundant transmission facilities.

For example, to broadcast 3 data streams i.e. N=3 and tolerate 2 link failures for each destination node, 4 coded data streams will be required, which can be generated as follows:

$$c_i = d_{1,0} \oplus_{r=1}^{2} d_{[i-(\alpha-1)2+r+\delta]mod(3),[\alpha r+(\alpha-1)]} \quad (6)$$

for $1 \leq i \leq 4$, where $\delta = \begin{cases} 0 & \text{if } i-(\alpha-1)2+r \leq 3 \\ 1 & \text{elsewhere} \end{cases}$, Hence, first group of coded data streams can be expressed as $$c_1 = d_{1,0} \oplus d_{2,1} \oplus d_{3,2}, \quad (7)$$

$$c_2 = d_{1,0} \oplus d_{2,2} \oplus d_{3,1}, \quad (8)$$

And, second group of coded data streams can be expressed as $$c_3 = d_{1,0} \oplus d_{2,3} \oplus d_{3,5}, \quad (9)$$

$$c_4 = d_{1,0} \oplus d_{2,5} \oplus d_{3,3}, \quad (10)$$

For the decoding process the method of the present invention has been derived and general notation for the decoding process as follows.

First, a selection of the coded data stream that will be used to extract a specific raw data stream is made, wherein the IDs of $(N-1)$ available coded data streams at the destination node will be checked, after neglecting $r_{available\ raw\ data\ stream}$ from there and for each required raw data stream position in each coded data stream's ID, $r_i$ will be compared. The coded data stream with smaller $r_i$ in its ID will be selected to extract the $i^{th}$ raw data stream.

As such, in a first example, for N=3, $d_1$, the first raw data stream, $c_1$, and $c_2$ are available at the destination node. The IDs of $c_1$ is [0, 1, 2] and $c_2$ is [0, 2, 1]. Now, $r_1$ from each ID will be neglected because $d_1$ is available, then it is noted that from comparing the IDs of $c_1$ and $c_2$ that $r_2$ in the ID of $c_1$ is less than that in the ID of $c_2$. Similarly, $r_3$ in the ID of $c_2$ is less than that in the ID of $c_1$. Hence, $c_1$ will be used to extract $d_2$, the second raw data stream, as its ID has the smaller $r_2$, and $c_2$ will be used to extract $d_3$, the third raw data stream, as its ID has the smaller $r_3$.

Additionally, in the case of $r_i$, $r_{i-1}$, and so on in the ID of the same coded data stream are less than those in the ID of the second (others) coded data stream(s), the results of differences between $r_i$ in the IDs of the coded data streams will determine which code will be used to extract the raw data stream. The larger the difference between $r_i$ in the ID of the coded data streams indicates that the $i^{th}$ data stream will be extracted from the coded data stream that has a smaller $r_i$ in its ID.

Additionally, in a second example of the first step, for N=3, $d_1$, $c_1$, and $c_3$ are available at the destination node. The IDs of $c_1$ is [0, 1, 2] and $c_3$ is [0, 3, 5]. Now, $r_1$ from each ID will be neglected because $d_1$ is available. It is noted that $r_2$ and $r_3$ in the ID of $c_1$ have smaller values than those in the ID of $c_3$. Hence, the difference of $r_2$ in the IDs of $c_1$ and $c_3$ is calculated. Similarly, the difference of $r_3$ in the IDs of $c_1$ and $c_3$ is calculated.

$|r_2$ in the ID of $c_1 - r_2$ in the ID of $c_3| = |1-3| = 2$, $|r_3$ in the ID of $c_1 - r_3$ in the ID of $c_3| = |2-5| = 3$.

Since the larger the difference between $r_3$ in the IDs of $c_1$ and $c_3$ is obtained and the ID of $c_1$ has the smaller $r_3$, hence, $c_1$ will be used to extract $d_3$ and $c_3$ will be used to extract $d_2$.

In a second step, after selecting the coded data streams to decode the raw data streams, the required raw data stream is extracted using the general decoding notation as follows:

$$b_{i,k} = c_{s,(k+r_i \text{ in } c_s)} \oplus b_{m,(k+(r_i-r_m) \text{ in } c_s)} \oplus b_{l,(k+(r_i-r_l) \text{ in } c_s)} \oplus \ldots \quad (11)$$

where $b_{i,k}$ is the bit k of raw data stream $d_i$, $c_s$ is the selected coded data stream, $b_{m,(k+\ldots)}$, $b_{l,(k+\ldots)}$, and so on (based on the number of broadcasted data streams) are the known bits from other raw data streams. For N=3 with one available raw data stream at destination node, the decoding processes are expressed in Table II while the decoding processes with no raw data stream at destination node, are expressed in Table III.

TABLE II

Enhanced DC-NC decoding scheme with one raw data stream at destination node

| Available $d_i$ | Coded data | | Raw data streams after decoding (bit level) |
|---|---|---|---|
| | $1^{st}$ code & its ID | $2^{nd}$ code & its ID | |
| $d_1$ | $c_1$ [0, 1, 2] | $c_2$ [0, 2, 1] | $b_{2,k} = c_{1,(k+1)} \oplus b_{1,(k+1)} \oplus b_{3,(k-1)}$ $b_{3,k} = c_{2,(k+1)} \oplus b_{1,(k+1)} \oplus b_{2,(k-1)}$ |
| $d_1$ | $c_1$ [0, 1, 2] | $c_3$ [0, 3, 5] | $b_{2,k} = c_{3,(k+3)} \oplus b_{1,(k+3)} \oplus b_{3,(k-2)}$ $b_{3,k} = c_{1,(k+2)} \oplus b_{1,(k+2)} \oplus b_{2,(k+1)}$ |
| $d_1$ | $c_1$ [0, 1, 2] | $c_4$ [0, 5, 3] | $b_{2,k} = c_{1,(k+1)} \oplus b_{1,(k+1)} \oplus b_{3,(k-1)}$ $b_{3,k} = c_{4,(k+3)} \oplus b_{1,(k+3)} \oplus b_{2,(k-2)}$ |
| $d_1$ | $c_2$ [0, 2, 1] | $c_3$ [0, 3, 5] | $b_{2,k} = c_{3,(k+3)} \oplus b_{1,(k+3)} \oplus b_{3,(k-2)}$ $b_{3,k} = c_{2,(k+1)} \oplus b_{1,(k+1)} \oplus b_{2,(k-1)}$ |

TABLE II-continued

Enhanced DC-NC decoding scheme with one
raw data stream at destination node

| Available $d_i$ | Coded data | | Raw data streams after decoding (bit level) |
|---|---|---|---|
| | 1st code & its ID | 2nd code & its ID | |
| $d_1$ | $c_2$ [0, 2, 1] | $c_4$ [0, 5, 3] | $b_{2,k} = c_{2,(k+2)} \oplus b_{1,(k+2)} \oplus b_{3,(k+1)}$ $b_{3,k} = c_{4,(k+1)} \oplus b_{1,(k+3)} \oplus b_{2,(k-2)}$ |
| $d_1$ | $c_3$ [0, 3, 5] | $c_4$ [0, 5, 3] | $b_{2,k} = c_{3,(k+3)} \oplus b_{1,(k+3)} \oplus b_{3,(k-2)}$ $b_{3,k} = c_{4,(k+3)} \oplus b_{1,(k+3)} \oplus b_{2,(k-2)}$ |
| $d_2$ | $c_1$ [0, 1, 2] | $c_2$ [0, 2, 1] | $b_{1,k} = c_{1,k} \oplus b_{2,(k-1)} \oplus b_{3,(k-2)}$ $b_{3,k} = c_{1,(k+2)} \oplus b_{2,(k-1)} \oplus b_{1,(k+1)}$ |
| $d_2$ | $c_1$ [0, 1, 2] | $c_3$ [0, 3, 5] | $b_{1,k} = c_{3,k} \oplus b_{2,(k-3)} \oplus b_{3,(k-5)}$ $b_{3,k} = c_{1,(k+2)} \oplus b_{2,(k+1)} \oplus b_{1,(k+2)}$ |
| $d_2$ | $c_1$ [0, 1, 2] | $c_4$ [0, 5, 3] | $b_{1,k} = c_{4,k} \oplus b_{2,(k-5)} \oplus b_{3,(k-3)}$ $b_{3,k} = c_{1,(k+2)} \oplus b_{2,(k+1)} \oplus b_{1,(k+2)}$ |
| $d_2$ | $c_2$ [0, 2, 1] | $c_3$ [0, 3, 5] | $b_{1,k} = c_{3,k} \oplus b_{2,(k-3)} \oplus b_{3,(k-5)}$ $b_{3,k} = c_{2,(k+1)} \oplus b_{2,(k-1)} \oplus b_{1,(k+1)}$ |
| $d_2$ | $c_2$ [0, 2, 1] | $c_4$ [0, 5, 3] | $b_{1,k} = c_{4,k} \oplus b_{2,(k-5)} \oplus b_{3,(k-3)}$ $b_{3,k} = c_{2,(k+1)} \oplus b_{2,(k-1)} \oplus b_{1,(k+1)}$ |
| $d_2$ | $c_3$ [0, 3, 5] | $c_4$ [0, 5, 3] | $b_{1,k} = c_{3,k} \oplus b_{2,(k-3)} \oplus b_{3,(k-5)}$ $b_{3,k} = c_{4,(k+3)} \oplus b_{1,(k+3)} \oplus b_{1,(k+3)}$ |
| $d_3$ | $c_1$ [0, 1, 2] | $c_2$ [0, 2, 1] | $b_{1,k} = c_{2,k} \oplus b_{2,(k-2)} \oplus b_{3,(k-1)}$ $b_{2,k} = c_{1,(k+1)} \oplus b_{1,(k+1)} \oplus b_{3,(k-1)}$ |
| $d_3$ | $c_1$ [0, 1, 2] | $c_3$ [0, 3, 5] | $b_{1,k} = c_{3,k} \oplus b_{2,(k-3)} \oplus b_{3,(k-5)}$ $b_{2,k} = c_{1,(k+1)} \oplus b_{1,(k+1)} \oplus b_{3,(k-1)}$ |
| $d_3$ | $c_1$ [0, 1, 2] | $c_4$ [0, 5, 3] | $b_{1,k} = c_{4,k} \oplus b_{2,(k-5)} \oplus b_{3,(k-3)}$ $b_{2,k} = c_{1,(k+1)} \oplus b_{1,(k+1)} \oplus b_{3,(k-1)}$ |
| $d_3$ | $c_2$ [0, 2, 1] | $c_3$ [0, 3, 5] | $b_{1,k} = c_{3,k} \oplus b_{2,(k-3)} \oplus b_{3,(k-5)}$ $b_{2,k} = c_{2,(k+2)} \oplus b_{1,(k+2)} \oplus b_{3,(k+1)}$ |
| $d_3$ | $c_2$ [0, 2, 1] | $c_4$ [0, 5, 3] | $b_{1,k} = c_{4,k} \oplus b_{2,(k-5)} \oplus b_{3,(k-3)}$ $b_{2,k} = c_{2,(k+2)} \oplus b_{1,(k+2)} \oplus b_{3,(k+1)}$ |
| $d_3$ | $c_3$ [0, 3, 5] | $c_4$ [0, 5, 3] | $b_{1,k} = c_{4,k} \oplus b_{2,(k-5)} \oplus b_{3,(k-3)}$ $b_{2,k} = c_{3,(k+1)} \oplus b_{1,(k+3)} \oplus b_{3,(k-2)}$ |

TABLE III

Enhanced DC-NC decoding scheme with no
raw data stream at destination node

| Coded data | | | |
|---|---|---|---|
| 1st code & its ID | 2nd code & its ID | 3rd code & its ID | Raw data streams after decoding |
| $c_1$ [0, 1, 2] | $c_2$ [0, 2, 1] | $c_3$ [0, 3, 5] | $b_{1,k} = c_{3,k} \oplus b_{2,(k-3)} \oplus b_{3,(k-5)}$ $b_{2,k} = c_{1,(k+1)} \oplus b_{1,(k+1)} \oplus b_{3,(k-1)}$ $b_{3,k} = c_{2,(k+1)} \oplus b_{1,(k+1)} \oplus b_{2,(k-1)}$ |
| $c_1$ [0, 1, 2] | $c_2$ [0, 2, 1] | $c_4$ [0, 5, 3] | $b_{1,k} = c_{4,k} \oplus b_{2,(k-5)} \oplus b_{3,(k-3)}$ $b_{2,k} = c_{1,(k+1)} \oplus b_{1,(k+1)} \oplus b_{3,(k-1)}$ $b_{3,k} = c_{2,(k+1)} \oplus b_{1,(k+1)} \oplus b_{2,(k-1)}$ |
| $c_1$ [0, 1, 2] | $c_3$ [0, 3, 5] | $c_4$ [0, 5, 3] | $b_{1,k} = c_{3,k} \oplus b_{2,(k-3)} \oplus b_{3,(k-5)}$ $b_{2,k} = c_{1,(k+1)} \oplus b_{1,(k+1)} \oplus b_{3,(k-1)}$ $b_{3,k} = c_{4,(k+3)} \oplus b_{1,(k+3)} \oplus b_{2,(k-2)}$ |
| $c_2$ [0, 2, 1] | $c_3$ [0, 3, 5] | $c_4$ [0, 5, 3] | $b_{1,k} = c_{4,k} \oplus b_{2,(k-5)} \oplus b_{3,(k-3)}$ $b_{2,k} = c_{3,(k+3)} \oplus b_{1,(k+3)} \oplus b_{3,(k-2)}$ $b_{3,k} = c_{2,(k+1)} \oplus b_{1,(k+1)} \oplus b_{2,(k-1)}$ |

In Table II and Table III, for $b_{i,(k-a)}$, where a is any number between 0 and $r_{max}$, $$b_{i,(k-a)} = 0 \quad 0 > (k-a) \geq B \quad (12)$$

In this way, the eDC-NC coding method of the present invention can provide maximum reliability, ultra-low recovery time with minimal computational complexity, and high throughput.

Table IV shows the performance differences between eDC-NC and standard DC-NC.

TABLE IV

THE COMPARISON BETWEEN ENHANCED
DC-NC AND REGULAR DC-NC

| Criteria | eDC-NC | DC-NC |
|---|---|---|
| Encoding and decoding complexity | Less and same for any # of coded data | High and increases with increasing the # of coded data |
| Decoding scheme | bit by bit XOR substitution | Matrix inversion |
| Failed data recovery | Near-instant | Fast but decreases with increased number of coded data streams |

Wireless link capacity limitations and failures can cause degradation in throughput and reliability for 5G wireless fronthaul F-RANs. The Enhanced DC-NC method of the present invention is a promising technology to maximize the reliability of F-RAN fronthaul networks while enabling ultra-low recovery time from link/node failures and increasing throughput in broadcast and other applications.

Figure 8:
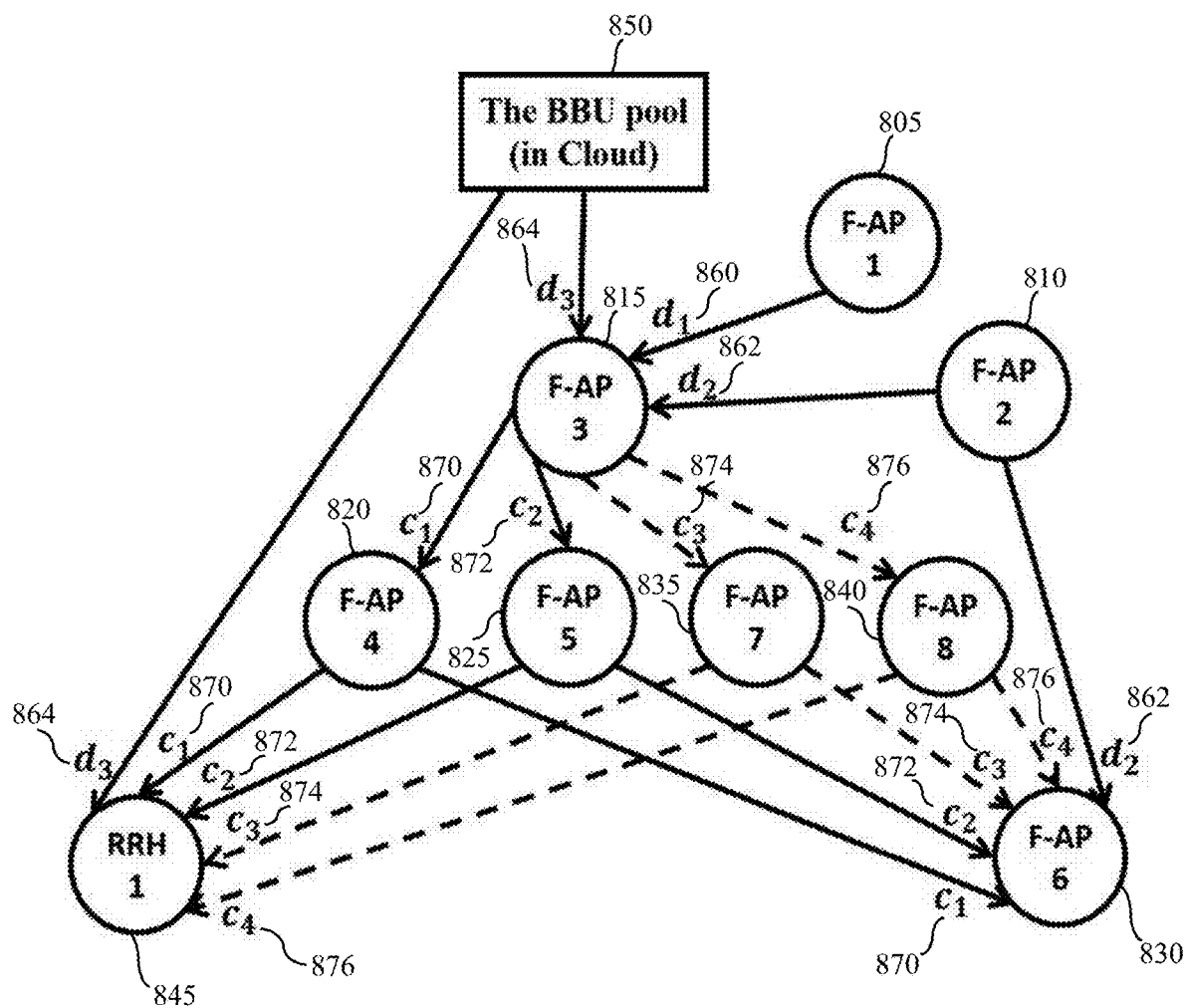
FIG. 8 illustrates an exemplary embodiment of eDC-NC coding applied to a 5G wireless fronthaul F-RAN, where solid lines represent the links that carry coded data streams and are used to improve network throughput and dashed lines represent the links that carry coded data streams and are used to maximize network reliability, in accordance with an embodiment of the present invention.

The application of eDC-NC coding to a mixture of the C-RAN and Local Distributed Coordination (LDC) transmission modes in a F-RAN network is illustrated in FIG. 8. Here, wireless links are connecting F-APs 805, 810, 815, 820, 825, 830, 835, 840 and an RRH 845 to each other in a mesh topology, where each fronthaul link is bi-directional. To model the application of broadcasting three data streams $d_1$ 860, $d_2$ 862, and $d_3$ 864 from the BBU pool 850 and two F-APs 805, 810 to one RRH 845 and one F-AP 830, a multipoint-to-multipoint network topology is considered. With eDC-NC, five disjoint paths are needed to broadcast three data streams, $d_3$ 864 from the BBU pool 850 and two F-APs $d_1$ 860 and $d_2$ 862 to two destination nodes RRH1 845 and F-AP6 830. Utilizing direct links, data streams $d_2$ 862 and $d_3$ 864 are sent from F-AP2 810 and the BBU pool 850 to F-AP6 830 and RRH1 845, respectively. In addition, F-AP3 815 receives data streams $d_1$ 860, $d_2$ 862, and $d_3$ 864 and forms coded data $c_1$ 870, $c_2$ 872, $c_3$ 874 and $c_4$ 876, as shown in (7)-(10), and then sends them to F-AP4 820, F-AP5 825, F-AP7 835 and F-AP8 840, respectively. F-AP4 820 and F-AP5 825 send $c_1$ 870 and $c_2$ 872, respectively to RRH1 845 and F-AP6 830. Coded data streams $c_1$ 870 and $c_2$ 872, in addition to data stream $d_3$ 864 are decoded in RRH1 845 to obtain $d_1$ 860 and $d_2$ 862, as previously described and shown in Table II. Similarly, $c_1$ 870, $c_2$ 872 and $d_2$ 862 are decoded in F-AP6 830 to get $d_1$ 860 and $d_3$ 864. As such, the throughput gains in this exemplary network are improved by at least 20%.

Wireless fronthaul network reliability can be improved by transmitting $c_3$ 874 and $c_4$ 876 from F-AP7 835 and F-AP8 840 respectively to RRH1 845 and F-AP6 830. The coded data $c_3$ 874 and $c_4$ 876 will be ignored when there is no link failure. In the presence of a link failure, for example if the link from the F-AP2 810 to F-AP6 830 fails, F-AP6 830 detects the failure and then recovers $d_1$ 860, $d_2$ 862, and $d_3$ 864 by utilizing $c_1$ 870, $c_2$ 872 and $c_3$ 874 using the decoding algorithm previously described and as shown in Table III. In addition, if $c_1$ 870 is lost, F-AP6 830 has $d_2$ 862, $c_2$ 872 and $c_3$ 874 and can then quickly and easily recover $d_1$ 860 and $d_3$ 864. Furthermore, if two link failures at F-AP6 830 occur, for example $d_1$ 860 and $c_2$ 872, F-AP6 830 detects the failures and then recovers $d_1$ 860, $d_2$ 862, and $d_3$ 864 by utilizing $c_1$ 870, $c_3$ 874 and $c_4$ 876, as illustrated in Table III. Similarly, any two link failures can be recovered in the same way. Note that the BBU 850 can transmit $d_3$ 864 directly to F-AP6 830 using the direct link between them, instead of sending it to F-AP3 815, but in this case, $d_3$ 864 will not be recoverable since it will not be included in coded data streams. In addition, the BBU pool 850 can send $d_3$ 864 to both destination nodes RRH1 845 and F-AP6 830 and to F-AP3 815. However, this will increase the burden on the fronthaul network, and the F-RAN was introduced to decrease fronthaul complexity. As shown in FIG. 8, only two links from the BBU pool 850 to RRH1 845 and F-AP3 815 are required to transmit the required data stream and make it recoverable.

Moreover, not only multiple link failures can be recovered by eDC-NC coding in this example fronthaul network. Two intermediate node failures, such as F-AP4 820 and F-AP5 825, can be tolerated since this corresponds to four simultaneous link failures and each pair is associated with different destination nodes. Also, when a failure occurs on F-AP7 835 and F-AP8 840, $c_3$ 874 and $c_4$ 876 will be lost i.e. protection of the network but, if these are the only failures, successful data communication can still be achieved. In general, eDC-NC networks can tolerate n link failures for each destination node at k destination nodes, however, kn+n redundant links are required, where n≤N.

As such, in this exemplary embodiment, the method for enhanced DC-NC synergistically combines Diversity and modified Triangular Network Coding, and is introduced in this embodiment to improve the performance of 5G wireless fronthaul F-RANs. It is illustrated that eDC-NC can simultaneously recover from multiple link/node failures, nearly-instantaneously. In addition, an algorithm and a general notation for the eDC-NC decoding process are presented. Furthermore, eDC-NC networks can tolerate n link failures, where n≤number of broadcasted data streams for each receiver node at k receiver nodes, with kn+n redundant links. Applying eDC-NC coding minimizes the impact on latency of multiple link/node failures in wireless fronthaul network links, while simultaneously improving the throughput in the network by at least 20% for three broadcasted data streams.

Furthermore, for multipoint-to-multipoint topology, the number of overall utilized links for k source F-APs can be expressed as kj+(2k−1)+jn+n. One of the important parameters that can determine the scalability of any protection method is the redundancy link percentage, which is equal to the number of required redundant links divided by the number of overall utilized links. Hence, the redundancy percentage (R) can be expressed as:

$$R = \frac{jn+n}{kj+(2k-1)+jn+n} \times 100 \quad (13)$$

Figure 9A:
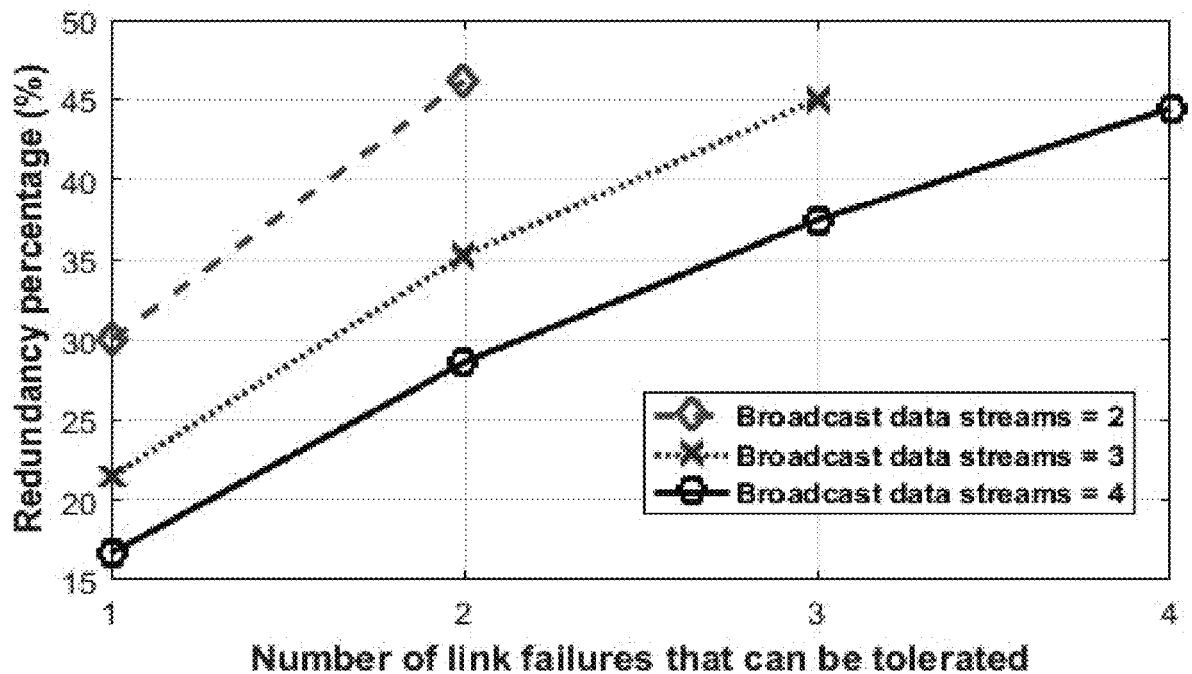
FIG. 9A illustrates the number of link failures that can be tolerated when the number of destination F-APs=2, in accordance with an embodiment of the present invention.
Figure 9B:
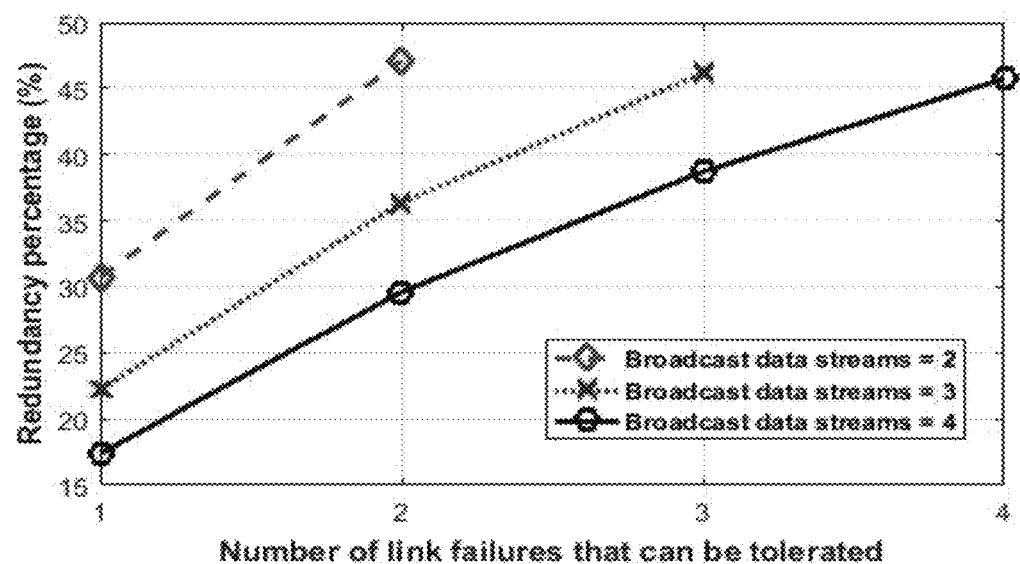
FIG. 9B illustrates the number of link failures that can be tolerated when the number of destination F-APs=3, in accordance with an embodiment of the present invention.

Using (13), the relationship between the redundancy percentage versus number of link failures that can be tolerated for two and three destination F-APs respectively in Fog-RAN networks with various broadcast data streams is plotted and depicted in FIG. 9A and FIG. 9B. It is shown that the number of destination nodes has no significant effect on the required redundancy percentage. Furthermore, the figures illustrate the inverse relationship between the required redundancy percentage (R) to tolerate n link failures and the number of broadcast data streams.

Figure 10:
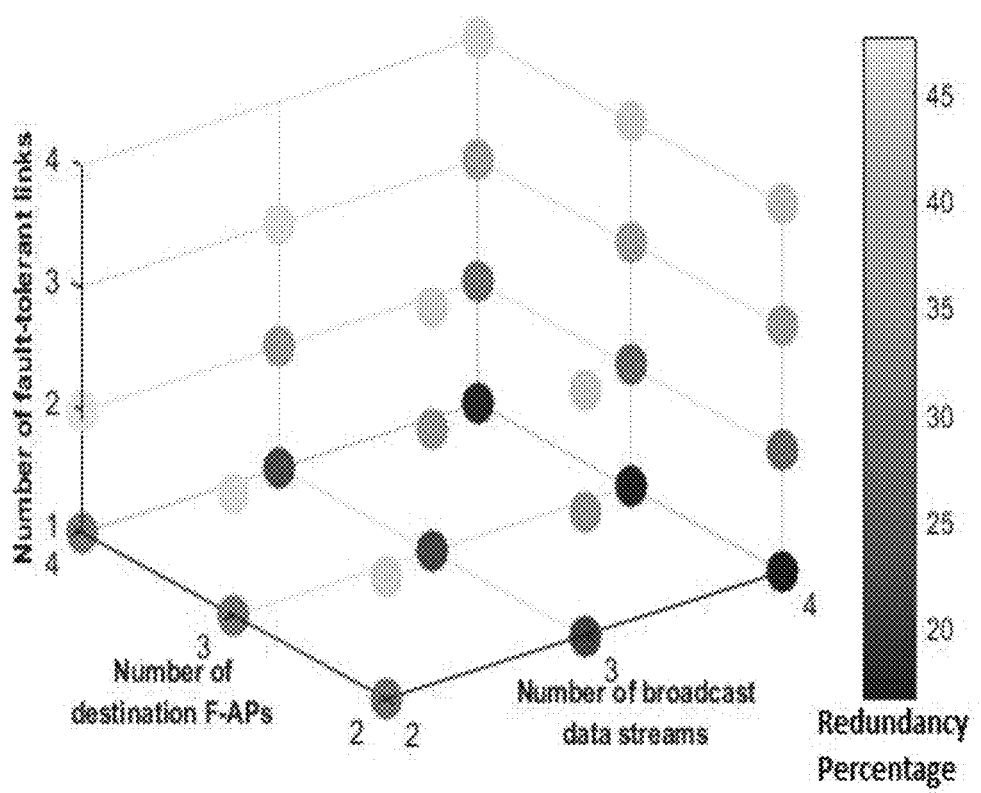
FIG. 10 illustrates the enhanced DC-NC coding redundancy percentage versus number of fault-tolerant links, destination F-APs, and broadcast data streams, in accordance with an embodiment of the present invention.

Similarly, FIG. 10, illustrates the redundancy percentage versus number of link failures that can be tolerated, number of broadcast data streams, and the number of destination F-APs. Again, it is noted that the required redundancy percentage for tolerance of n link failures is inversely related to the number of broadcast data streams, which clearly demonstrates the scalability of eDC-NC coding. In addition, the redundancy percentage for complete protection is always less than 50% for the practical cases that were evaluated.

This embodiment presented the application of enhanced DC-NC, which synergistically combines Diversity and modified Triangular Network Coding, to improve the performance of 5G wireless fronthaul F-RANs. It is shown that enhanced DC-NC can simultaneously recover from multiple link/node failures. Furthermore, enhanced DC-NC networks can tolerate n link failures for each F-AP at j destination F-APs, with jn+n redundant links. Moreover, it is shown that the redundancy percentage for n link failures is inversely related to the number of source F-APs, which illustrates the scalability of eDC-NC coding. In addition, the redundancy percentage for complete protection is always less than 50%. Applying eDC-NC coding minimizes the impact on latency of multiple link/node failures in wireless fronthaul network links and significantly improves the reliability of F-RAN networks.

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The invention claimed is:

1. A method for transmission over a network, the method comprising:
    generating, a first group of N−1 coded data packets from N uncoded data packets;
    transmitting each coded data packet of the first group of N−1 coded data packets to a first receiving node of two or more receiving nodes of the network over one of a plurality of indirect links;
    transmitting each coded data packet of the first group of N−1 coded data packets to a second receiving node of the two or more receiving nodes of the network over one of the plurality of indirect links;
    transmitting a first uncoded data packet of the N uncoded data packets to the first receiving node of the two or more receiving nodes over one of a plurality of direct links;
    transmitting a second uncoded data packet of the N uncoded data packets to the second receiving node of the two or more receiving nodes over one of the plurality of direct links;
    receiving the first uncoded data packet and the first group of N−1 coded data packets at the first receiving node and using the first uncoded data packet and the first group of N−1 coded data packets at the first receiving node to recover the other N−1 uncoded data packets of the N uncoded data packets, other than the first uncoded data packet received at the first receiving node; and
    receiving the second uncoded data packet and the first group of N−1 coded data packets at the second receiving node and using the second uncoded data packet and the first group of N−1 coded data packets at the second receiving node to recover the other N−1 uncoded data packets of the N uncoded data packets, other than the second uncoded data packet received at the second receiving node.

2. The method of claim 1, wherein the network is selected from a wireless network, a wired network, or a combination of a wireless network and a wired network.

3. The method of claim 1, wherein generating a first group of N−1 coded data packets from N uncoded data packets further comprises generating the first group of N−1 coded data packets at a transmitting node in a point-to-multipoint network topology or at an eDC-NC encoding node in a multipoint-to-multipoint network topology.

4. The method of claim 1, further comprising:
    generating a second group of N−1 coded data packets from the N uncoded data packets;
    transmitting each coded data packet of the second group of N−1 coded data packets to the first receiving node over one of the plurality of indirect links;
    transmitting each coded data packets of the second group of N−1 coded data packets to the second receiving node over one of the plurality of indirect links;
    receiving the second group of N−1 coded data packets at the first receiving node and at the second receiving node; and
    when one or more link failures occur on one or more of the plurality of direct links or one or more of the plurality of indirect links of the network, using the second group of N−1 coded data packets to recover the N−1 uncoded data packets of the N uncoded data packets, other than the first uncoded data packet received at the first receiving node and other than the second uncoded data packet received at the second receiving node.

5. The method of claim 1, wherein generating the first group of N−1 coded data packets further comprises:
    adding N−1 redundant bits "0" to the N uncoded data packets and performing a bit XOR operation to generate a first coded data packet of the first group of N−1 coded data packets, wherein the first coded data packet has a unique ID of [0, 1, . . . , N−1]; and
    fixing a position of "0" in the unique ID of the first coded data packet and cyclically rotating all remaining elements in the unique ID of the first coded data packet to generate a next N−1 coded data packets of the first group of N−1 coded data packets.

6. The method of claim 1, wherein using the first uncoded data packet and the first group of N−1 coded data packets to recover the N−1 uncoded data packets of the N uncoded data packets, other than the first uncoded data packet received at the first receiving node further comprises:
    selecting one of the coded data packets of the first group of N−1 coded data packets to use to recover each of the N−1 uncoded data packets of the N uncoded data packets, other than the first uncoded data packet received at the first receiving node, based upon a comparison of a unique ID of each of the N−1 coded data packets; and performing a bit XOR back substitution operation of the selected coded data packet and the first uncoded data packet to recover the N−1 uncoded data packets of the N uncoded data packets, other than the first uncoded data packet received at the first receiving node.

7. The method of claim 1, wherein using the second uncoded data packet and the first group of N−1 coded data packets to recover the N−1 uncoded data packets of the N uncoded data packets, other than the second uncoded data packet received at the second receiving node further comprises:
selecting one of the coded data packets of the second group of N−1 coded data packets to use to recover each of the N−1 uncoded data packets, other than the second uncoded data packet received at the second receiving node, based upon a comparison of a unique ID of each of the N−1 coded data packets; and
performing a bit XOR back substitution operation of the selected coded data packet and the second uncoded data packet to recover the N−1 uncoded data packets of the N uncoded data packets, other than the second uncoded data packet received at the second receiving node.

8. The method of claim 4, wherein generating the second group of N−1 coded data packets further comprises:
wherein a first coded data packet of the second group of N−1 coded data packets has a unique ID of $[0, r_{2\alpha}, r_{2\alpha}+\alpha, \ldots, r_{2\alpha}+\alpha(N-2)]$, wherein $r_{2\alpha}$ is a smallest integer that is greater than a maximum number of redundant bits ($r_{max}$) in the first group of N−1 coded data packets; and
fixing a position of "0" in the unique ID of the first coded data packet of the second group of N−1 coded data packets and cyclically rotating all remaining elements in the unique ID of the first coded data packet of the second group of N−1 coded data packets to generate a next N−1 coded data packets of the second group of N−1 coded data packets.

9. The method of claim 3, wherein the plurality of transmission nodes are transmitting node is selected from a sensor node, a Fog Access Point (F-AP) node and a Baseband Unit (BBU) Pool node.

10. The method of claim 1, wherein the plurality of two or more first and second receiving nodes are selected from gateway nodes, Fog Access Point (F-AP) nodes and Remote Radio Head (RRH) nodes.

11. A transmission system for a network, the system comprising:
at least one transmitting node and two or more receiving nodes in the network;
the at least one transmitting node configured to perform steps of:
generating a first group of N−1 coded data packets from N uncoded data packets;
transmitting each coded data packet of the first group of N−1 coded data packets to a first receiving node a of the two or more receiving nodes of the network over one of a plurality of indirect links;
transmitting each coded data packet of the first group of N−1 coded data packets to a second receiving node of the two or more receiving nodes of the network over one of the plurality of indirect links;
transmitting a first uncoded data packet of the N uncoded data packets to the first receiving node of the two or more receiving nodes over one of a plurality of direct links;
transmitting a second uncoded data packet of the N uncoded data packets to the second receiving node of the two or more receiving nodes over one of the plurality of direct links;
each of the two or more receiving nodes configured to perform steps of:
receiving the first uncoded data packet and the first group of N−1 coded data packets at the first receiving node and using the first uncoded data packet and the first group of N−1 coded data packets at the receiving node to recover the other N−1 uncoded data packets of the N uncoded data packets, other than the first uncoded data packet received at the first receiving node; and
receiving the second uncoded data packet and the first group of N−1 coded data packets at the second receiving node and using the second uncoded data packet and the first group of N−1 coded data packets at the second receiving node to recover the other N−1 uncoded data packets of the N uncoded data packets, other than the second uncoded data packet received at the second receiving node.

12. The system of claim 11, wherein the network is selected from a wireless network, a wired network, or a combination of a wireless network and a wired network.

13. The system of claim 11, wherein generating a first group of N−1 coded data packets from N uncoded data packets further comprises generating the first N−1 coded data packets at a transmitting node in a point-to-multipoint network topology or at an eDC-NC encoding node in a multipoint-to-multipoint network topology.

14. The system of claim 11, further comprising:
generating a second group of N−1 coded data packets from the N uncoded data packets;
transmitting each coded data packet of the second group of N−1 coded data packets to the first receiving node over one of the plurality of indirect links;
transmitting each coded data packet of the second group of N−1 coded data packets to the second receiving node over one of the plurality of indirect links;
each of the receiving nodes further configured to perform steps of:
receiving the second group of N−1 coded data packets at the first receiving node and at the second receiving node; and
when one or more link failures occur on one or more of the plurality of direct links or one or more of the plurality of indirect links of the wireless network, using the second group of N−1 coded data packets to recover the N−1 uncoded data packets of the N uncoded data packets, other than the first uncoded data packet received at the first receiving node and other than the second uncoded data packet received at the second receiving node.

15. The system of claim 11, wherein generating the first group of N−1 coded data packets further comprises:
adding N−1 redundant bits "0" to the N uncoded data packets and performing a bit XOR operation to generate a first coded data packet of the first group of N−1 coded data packets, wherein the first coded data packet has a unique ID of $[0, 1, \ldots, N-1]$; and
fixing a position of "0" in the unique ID of the first coded data packet and cyclically rotating all remaining elements in the unique ID of the first coded data packet to generate a next N−1 coded data packets of the first group of N−1 coded data packets.

16. The system of claim 11, wherein using the first uncoded data packet and the first group of N−1 coded data packets to recover the N−1 uncoded data packets of the N uncoded data packets, other than the first uncoded data packet received at the first receiving node, further comprises:

selecting one of the coded data packets of the first group of N−1 coded data packets to use to recover each of the N−1 uncoded data packets of the N uncoded data packets, other than the first uncoded data packet received at the first receiving node, based upon a comparison of a unique ID of each of the N−1 coded data packets; and performing a bit XOR back substitution operation of the selected coded data packet and the first uncoded data packet to recover the N−1 uncoded data packets of the N uncoded data packets, other than the first uncoded data packet received at the first receiving node.

17. The system of claim 11, wherein using the second uncoded data packet and the first group of N−1 coded data packets to obtain the N−1 uncoded data packets, other than the second uncoded data packet received at the second receiving node, further comprises:

selecting one of the coded data packets of the first group of N−1 coded data packets to use to recover each of the N−1 uncoded data packets, other than the second uncoded data packet received at the second receiving node, based upon a comparison of a unique ID of each of the N−1 coded data packets; and performing a bit XOR back substitution operation of the selected coded data packet and the second uncoded data packet to recover the N−1 uncoded data packets, other than the second uncoded data packet received at the second receiving node.

18. The system of claim 14, wherein generating the second group of N−1 coded data packets further comprises:

wherein a first coded data packet of the second group of N−1 coded data packets has a unique ID of $[0, r_{2\alpha}, r_{2\alpha}+\alpha, \ldots, r_{2\alpha}+\alpha(N-2)]$, wherein $r_{2\alpha}$ is a smallest integer that is greater than a maximum number of redundant bits ($r_{max}$) in the first group of N−1 coded data packets; and fixing a position of "0" in the unique ID of the first coded data packet of the second group of N−1 coded data packets and cyclically rotating all remaining elements in the unique ID of the first coded data packet of the second group of N−1 coded data packets to generate a next N−1 coded data packets of the second group of N−1 coded data packets.

19. The system of claim 11, wherein the at least one transmitting node is selected from a sensor node, a Fog Access Point (F-AP) node and a Baseband Unit (BBU) Pool node.

20. The system of claim 11, wherein the two or more receiving nodes are selected from gateway nodes, Fog Access Point (F-AP) nodes and Remote Radio Head (RRH) nodes.

21. One or more non-transitory computer-readable media having computer-executable instructions for performing a method of running a software program on a computing device, the computing device operating under an operating system, the method including issuing instructions from the software program comprising:

generating a first group of N−1 coded data packets from N uncoded data packets;

transmitting each coded data packet of the first group of N−1 coded data packets to a first receiving node of two or more receiving nodes of a network over one of a plurality of indirect links;

transmitting each coded data packet of the first group of N−1 coded data packets to a second receiving node of the two or more receiving nodes of the network over one of the plurality of indirect links;

transmitting a first uncoded data packet of the N uncoded data packets to the first receiving node of the two or more receiving nodes over of a plurality of direct links;

transmitting a second uncoded data packet of the N uncoded data packets to the second receiving node of the two or more receiving nodes over one of the plurality of direct links;

receiving the first uncoded data packet and the first group of N−1 coded data packets at the first receiving node and using the first uncoded data packet and the first group of N−1 coded data packets at the first receiving node to recover the other N−1 uncoded data packets of the N uncoded data packets, other than the first uncoded data packet received at the first receiving node; and receiving the second uncoded data packet and the first group of N−1 coded data packets at the second receiving node and using the second uncoded data packet and the first group of N−1 coded data packets at the second receiving node to recover the other N−1 uncoded data packets of the N uncoded data packets, other than the second uncoded data packet received at the second receiving node.

22. The media of claim 21, further comprising instructions for:

generating a second group of N−1 coded data packets from the N uncoded data packets;

transmitting each coded data packet of the second group of N−1 coded data packets to the first receiving node over one of the plurality of indirect links;

transmitting each coded data packet of the second group of N−1 coded data packets to the second receiving node over one of the plurality of indirect links;

receiving the second group of N−1 coded data packets at the first receiving node and at the second receiving node; and when one or more link failures occur on one or more of the plurality of direct links or one or more of the plurality of indirect links of the network, using the second group of N−1 coded data packets to recover the N uncoded data packets of the N uncoded data packets, other than the first uncoded data packet received at the first receiving node and other than the second uncoded data packet received at the second receiving node.

23. The media of claim 21, wherein generating the first group of N−1 coded data packets further comprises:

adding N−1 redundant bits "0" to the N uncoded data packets and performing a bit XOR operation to generate a first coded data packet of the first group of N−1 coded data packets, wherein the first coded data packet has a unique ID of $[0, 1, \ldots, N-1]$; and fixing a position of "0" in the unique ID of the first coded data packet and cyclically rotating all remaining elements in the unique ID of the first coded data packet to generate a next N−1 coded data packets of the first group of N−1 coded data packets.

24. The media of claim 22, wherein generating the second group of N−1 coded data packets further comprises:

wherein a first coded data packet of the second group of N−1 coded data packets has a unique ID of $[0, r_{2\alpha}, r_{2\alpha}+\alpha, \ldots, r_{2\alpha}+\alpha(N-2)]$, wherein $r_{2\alpha}$ is a smallest integer that is greater than a maximum number of redundant bits ($r_{max}$) in the first group of N−1 coded data packets; and fixing a position of "0" in the unique ID of the first coded data packet of the second group of N−1 coded data packets and cyclically rotating all remaining elements in the unique ID of the first coded data packet of the second group of N−1 coded data packets to generate a next N−1 coded data packets of the second group of N−1 coded data packets.

25. The media of claim 21, wherein the network is selected from a wireless network, a wired network, or a combination of a wireless network and a wired network.

\* \* \* \* \*